United States Patent [19]

Paravano

[11] 4,422,276
[45] Dec. 27, 1983

[54] DOOR TRIM FASTENER ASSEMBLY

[75] Inventor: Reno R. Paravano, St. Clair Shores, Mich.

[73] Assignee: General Motors Corporation, Detroit, Mich.

[21] Appl. No.: 291,570

[22] Filed: Aug. 10, 1981

[51] Int. Cl.³ ............................................. E04B 1/38
[52] U.S. Cl. .................................... 52/511; 411/104; 411/107; 411/510
[58] Field of Search ................ 52/511, 716, 717, 787; 411/107, 104, 103, 509, 510

[56] References Cited

U.S. PATENT DOCUMENTS

| | | | |
|---|---|---|---|
| 2,080,769 | 5/1937 | Fitts | 52/716 |
| 2,704,680 | 3/1955 | Bedford, Jr. | 52/717 |
| 3,037,596 | 6/1962 | Fordyce | 52/511 |
| 3,213,506 | 10/1965 | Fernberg . | |
| 3,238,686 | 3/1966 | Pomeroy | 52/511 |
| 3,271,059 | 9/1966 | Pearson | 411/509 |
| 3,430,674 | 3/1969 | Forbush | 411/107 |
| 3,662,805 | 5/1972 | Sygnator | 52/787 |
| 3,894,377 | 7/1975 | Welch | 52/511 |
| 4,214,505 | 7/1980 | Aimar | 411/510 |

Primary Examiner—John E. Mortagh
Assistant Examiner—Michael Safavi
Attorney, Agent, or Firm—Patrick M. Griffin

[57] ABSTRACT

A door trim fastener assembly includes a headed fastener overlying the backing layer of a trim panel and having a shank which extends through a slot in the trim panel. The shank is located between the closed end of the slot and a hinged flap of the backing layer.

3 Claims, 6 Drawing Figures

DOOR TRIM FASTENER ASSEMBLY

BACKGROUND OF THE INVENTION

This invention relates to the assembly of headed trim panel fasteners to a composite trim panel.

Motor vehicles today are conventionally trimmed on the inside with composite trim panels of the type having a heavy cardboard or plastic backing layer, an outer ornamental layer of vinyl, cloth, leather or the like, and an intermediate layer of padding or other resilient material. It is desirable to assemble headed fasteners to the backing layer of the trim panel prior to press fitting the fasteners into holes in the body sheet metal to retain the entire trim assembly to the vehicle. Such fasteners in general have a head, a neck of reduced diameter and an elongated shank which includes resilient fins or other elements designed to retain the fastener in the sheet metal hole. It is necessary to mount the head of the fastener between the backing and decorative layers through a hole or slot which has a diameter or width smaller than the head to prevent withdrawal of the head.

One known assembly uses a keyhole shaped slot which consists of two slots opening to one another across a constricted portion. The first slot has a diameter or width larger than the head of the fastener, the second slot has a diameter or width less than that of the head but larger than that of the neck while the constricted portion has a width slightly less than the diameter of the neck. The head of the fastener is received through the first slot and the neck is snapped past the constricted portion into the second slot where it is retained. Such a structure is shown in Fernberg U.S. Pat. No. 3,213,506. This assembly requires that the material of the backing panel have a fairly high resiliency due to the snapping of the neck of the fastener through the constricted portion of the slot. Another known assembly uses a T-shaped slot which consists of two elongated slots opening to one another in a general T-shape and having a width less than the diameter of the head of the fastener such as shown in Fordyce U.S. Pat. No. 3,037,596. The fastener is tilted and the head is slid through one slot as the neck slides through the other slot. This assembly requires tilting of the fastener and is therefore not well suited to being automated. Another known assembly uses a fastener with a head having a general pie-shaped cutout therein. An edge portion of the head is inserted in a slot with a width less than the larger dimension of the head and the fastener is then rotated until the head screws into the slot.

SUMMARY OF THE INVENTION

This invention provides an improved assembly of a headed fastener to the backing layer of a composite trim panel. In the preferred embodiment, a slot having a width less than that of the head of the fastener is cut into the backing layer. The slot has a closed end and an open end which either opens to an outside edge of the backing layer or is wholly contained in the backing layer and opens to an access opening of a size to receive the head of the fastener. The head of the fastener is insertable between the backing layer and the intermediate resilient layer either from the outside edge of the panel or through the access opening and the neck of the fastener is moved through the slot to adjacent the closed end of the slot. An integral hinged flap included in the backing layer traverses the slot, either at the open end thereof or intermediate the open and closed ends thereof. The flap may be pivoted outwardly of the backing layer about the hinge to permit passage of the neck of the fastener past the flap to the closed end of the slot or may be pivoted inwardly of the backing layer and into the intermediate resilient layer to permit the head to pass by the flap as the neck moves to the closed end of the slot. Once the neck of the fastener has moved to the closed end of the slot, the flap is moved into general coplanar relationship with the backing layer to thereby retain the fastener between the flap and the closed end of the slot. In one embodiment, the flap includes the material of the access opening and may be colinear with or at an angle to the slot. In other embodiments, the flap may completely or partially traverse the slot intermediately thereof. In the latter instance, the gap between the end of the flap and the adjacent edge of the slot is less than the size of the neck of the fastener so that the neck of the fastener is retained thereby.

The primary feature of this invention is that it provides an improved assembly of a headed trim panel fastener to the backing layer of a composite trim panel by trapping the neck of the fastener between the closed end of a slot in the backing layer and an integral hinged flap included in the backing layer. Another feature is that the hinged flap is movable either inwardly or outwardly of the plane of the backing layer to allow insertion or removal of the head of the fastener. A further feature is that the slot may open either to an edge of the backing layer or be wholly contained in the backing layer and open to an access opening therethrough of a size to receive the head of the fastener. Yet another feature is that the integral hinged flap traverses the slot either at the open end thereof or intermediately the open and closed ends thereof.

BRIEF DESCRIPTION OF THE DRAWINGS

These and other features of the invention will appear from the following written description and the accompanying drawings in which.

DESCRIPTION OF THE PREFERRED EMBODIMENT

Figure 3:
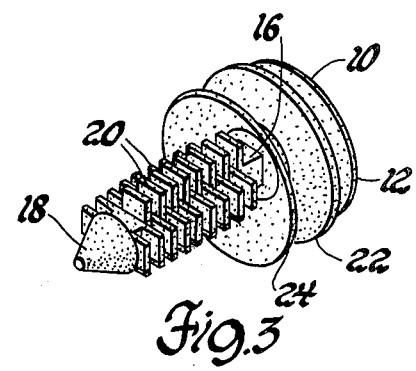
FIG. 3 is a perspective view of a headed fastener.
Figure 2:
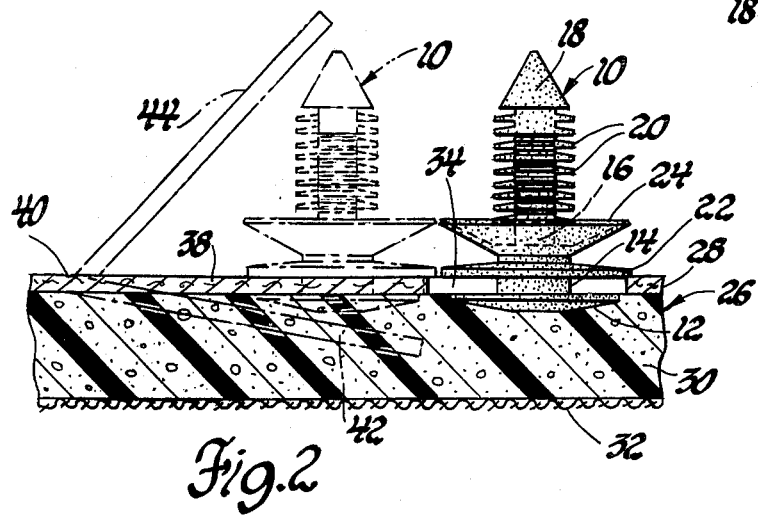
FIG. 2 is a sectional view taken along line 2—2 of FIG. 1.

Referring first to FIGS. 2 and 3, a headed fastener 10 is of a molded one piece plastic construction and includes a head 12, a neck 14 of reduced size, and an elongated square shaped shank 16 which includes a conical point 18 and a series of flexible retention fins 20 adapted to be received in a hole in the body sheet metal when inserted therethrough. Fastener 10 also includes a retention shoulder 22 and a frustoconical flexible sealing shoulder 24 which seals to the sheet metal around the hole therein when the shank 16 is inserted therethrough.

Figure 1:
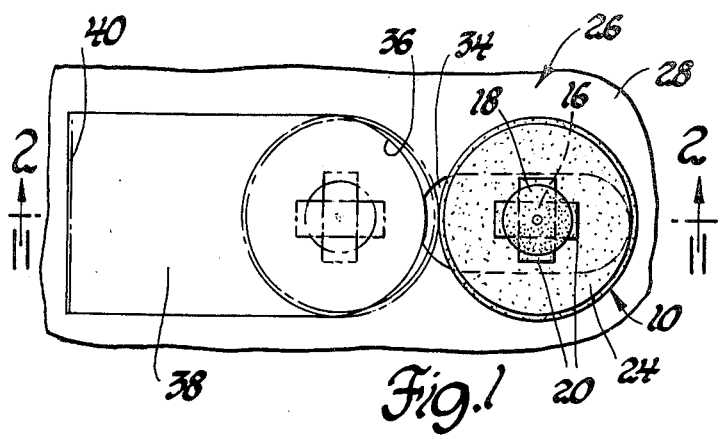
FIG. 1 is a plan view of one embodiment of the subject invention showing a portion of a backing layer of a trim panel and a headed fastener assembled thereto.

Referring now to FIGS. 1 and 2, a trim panel 26 includes a planar backing layer 28 which may be of a heavy cardboard, fiberboard or plastic material. An intermediate resilient layer 30 of plastic foam or similar material is covered by an outer decorative layer 32 of fabric, leather, vinyl or the like. When trim panel 26 is assembled to the inside of a vehicle, decorative layer 32 is visible while backing layer 28 faces the body sheet metal and is not visible. Backing layer 28 includes a first, wholly contained, elongated slot 34 which has a width less than the size of head 12 and greater than the size of neck 14. Head 12 and neck 14 may be circular, square or any other shape, but the size relation described assures that slot 34 will admit neck 14 but not head 12. Thus, when fastener 10 is assembled to backing layer 28 is shown in the solid lines of FIG. 2, neck 14 is within slot 34 while head 12 is located inwardly of backing layer 28 and compressed into resilient layer 30 and cannot be pulled straight out of slot 34. In addition, retention shoulder 22 engages backing layer 28 outwardly thereof and cooperates with the head 12 is resiliently gripping backing layer 28 on either side of slot 34.

Opening to first slot 34 is a second elongated slot 36, which, in this embodiment, is an access opening and is colinear with slot 34. A flap 38, formed of the material of backing layer 28, is integrally hinged to layer 28 at 40. Flap 38 normally rests coplanar with backing layer 28 but may be moved about hinge 40 to either of two open positions, either the position shown at 42 wherein flap 40 compresses resilient layer 30, or position 44 outwardly of backing layer 28, either position allowing assembly or removal of fastener 10. When flap 38 is in the normal coplanar position, it is apparent that fastener 10 will be retained in backing layer 28. Further details of the flap 38 and the retention of fastener 10 are described below.

To assemble fastener 10 to the backing layer 28, the flap 38 is moved manually or otherwise to the outward position 44 allowing head 12 to be inserted through second slot 36, whereupon neck 14 is moved to the side or to the right as shown in FIG. 2, and into slot 34, with head 12 and retention shoulder 22 acting to grip the backing layer 28 to the sides of slot 34. Flap 38 may then be moved back to its normal position coplanar with backing layer 28. Fastener 10 is thus retained as neck 14 is trapped between the closed end of slot 34 and the end of flap 38, but fastener 10 may still be adjusted relative to backing layer 28 by being moved back and forth in elongated slot 34. Fastener 10 may also be assembled by moving flap 38 into resilient layer 30 to the position 42 by pushing in on flat 38 with head 12, and then sliding neck 14 into slot 34 as before, with flap 38 moving back to its normal coplanar position under the resiliency of layer 30. This method of assembly may be easily automated. With either method of assembly, second slot 36 and flap 38 may be cut in one operation with a sharp die member, with hinge 40 being integral. Hinge 40 will be only slightly stressed as flap 38 deflects over a small arc, and hinge 40 may, of course, be strengthened with tape or similar material desired. The cutting of slot 36 and flap 38 with a sharp die assures that the edges of flap 38 will engage the sides of second slot 36 to frictionally retain flap 38 in its normal coplanar position. However, flap 38 could, if desired, be formed of a separate material and second slot 36 and flap 38 need not be formed exactly colinearly with slot 34, the embodiment shown in FIG. 1 simply giving the added advantage of linear movement of fastener 10 from second slot 36 into slot 34.

Figure 4:
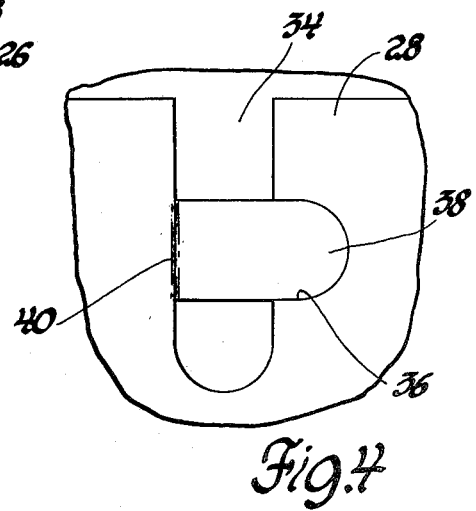
FIGS. 4, 5 and 6 are plan views of a portion of a backing layer of a trim panel showing alternative embodiments of the hinged flap.
Figure 5:
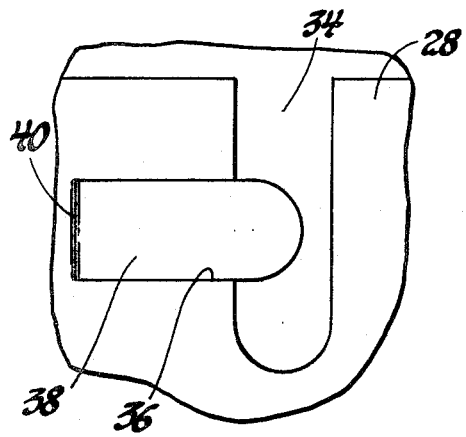
Figure 6:
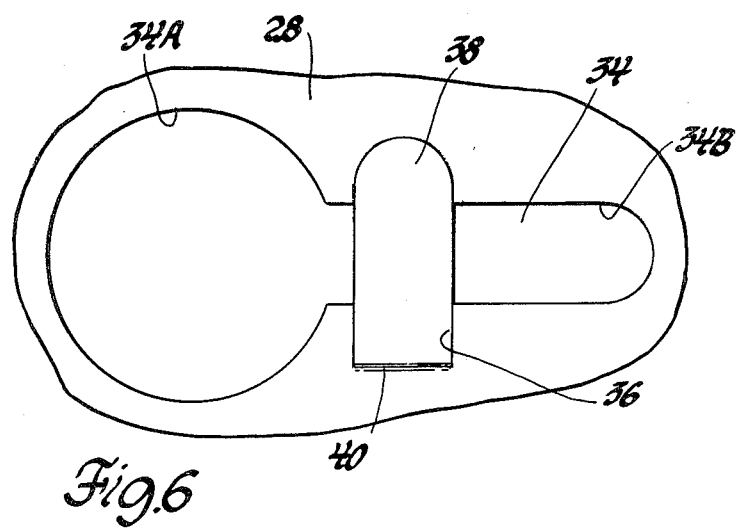

Alternative embodiments of the invention appear in FIGS. 4, 5 and 6, in which the second slots 36 contain flaps 38 but do not also serve as access openings. In FIGS. 4 and 5, elongated slot 34 opens to an outside edge of backing layer 28, but the second slot 36, since it is not an access opening, need not be wide enough to receive head 12. As with the previous embodiment, a flap 38 which is hinged at 40 is either cut into backing layer 28 or added separately, and hinge 40 may be either formed integrally with backing layer 28 or be strengthened. In FIG. 4, flap 38 traverses slot 34 entirely, with hinge 40 being coextensive with one side of slot 34 and with the end of flap 38 frictionally engaging the sides of second slot 36 to retain it in the coplanar position. In FIG. 5, flap 38 does not completely traverse slot 34 but covers enough of it that neck 14 will be trapped between the end of flap 38 and the end of slot 34. Hinge 40 is spaced to the side of an edge of slot 34 so that a sufficient length of the sides of flap 38 will engage the sides of second slot 36 to retain it in the coplanar position.

The embodiment of FIG. 6 includes a keyhole shaped slot 34 with an access portion 34A opening to an elongated portion 34B. As with the embodiment of FIG. 1, access portion 34A is wide enough to receive the head of fastener 12, and elongated portion 34B has the same width as slot 34. Flap 38 is coextensive with second slot 36 and completely traverses elongated portion 34B in a manner similar to the embodiment of FIG. 4. Hinge 40, however, is spaced to one side of an edge of elongated portion 34B as in the embodiment of FIG. 5. The slots 36 and 34 may also be cut with a die, and hinge 40 and flap 38 may be formed as in the other embodiments.

All embodiments achieve the same result by retaining fastener 10 to backing layer 28, by trapping head 12 and neck 14 within an elongated slot 34 with a flap 38 which partially or completely traverses slot 34. In all cases, fastener 10 may be inserted with simple linear push and pull motions, and hinge 40 is stressed over a small arc of movement.

The embodiments of the invention in which an exclusive property or privilege is claimed are defined as follows:

1. A door trim fastener assembly, comprising, in combination, a fastener having a head portion and a neck portion of smaller size than the head portion, a trim panel including a planar backing layer and a resilient layer beneath the backing layer, the backing layer having a slot with a closed end and an open end through which the neck portion of the fastener is receivable and having a width less than the width of the head portion of the fastener, the planar backing layer further including a flap hinged thereto of a width sufficient to receive the fastener head portion through the backing layer as the head portion moves the flap between a first position substantially coplanar with the backing layer and at least partially traversing the slot to block removal of the neck portion of the fastener from the slot and a second position resiliently compressed into the resilient layer as the fastener is moved substantially perpendicularly to the backing layer to allow insertion of the neck portion of the fastener through the open end of the slot, the flap moving back to first position under the resiliency of the resilient layer to retain the fastener.

2. A door trim fastener assembly comprising, in combination, a fastener having a head portion and a neck portion of smaller size than the head portion, a trim panel including a planar backing layer and a resilient layer beneath the backing layer, the backing layer having a first slot with a closed end and an open end through which the neck portion of the fastener is receivable and having a width less than the width of the head portion of the fastener, whereby the head portion lies inwardly of the planar backing layer to either side of the first slot when the neck portion is received in the first slot, the planar backing layer further including a second slot opening to the open end of the first slot and of a size to receive the head portion of the fastener therethrough to allow the fastener to be inserted into the first slot while remaining generally perpendicular to the backing layer, the backing layer further including a flap hinged thereto and coextensive with the second slot and movable by the head portion of the inserted fastener between a first position substantially coplanar with the backing layer and blocking the open end of the slot to trap the neck portion of the fastener between the end of the flap and the closed end of the slot, and a second non-coplanar position with respect to the backing layer resiliently compressed into the resilient layer to allow movement of the head portion of the fastener through the second slot and into inwardly lying relationship to the backing layer to either side of the first slot, the resiliently compressed flap moving back to first position after fastener insertion to retain the fastener.

3. A door trim fastener assembly comprising, in combination, a fastener having a head portion and a neck portion of smaller size than the head portion, a trim panel including a planar backing layer and a resilient layer beneath the backing layer, the backing layer having a first slot with a closed end and an open end through which the neck portion of the fastener is receivable and having a width less than the width of the head portion of the fastener, the planar backing layer further including a second slot opening to the open end of the first slot and colinear therewith and of a size to receive the head portion of the fastener therethrough to allow the fastener to be inserted into the first slot while remaining generally perpendicular to the backing layer, the backing layer further including an integral flap integrally hinged thereto for movement between a first position substantially coplanar with the backing layer and blocking the open end of the first slot to trap the neck portion of the fastener between the flap and the closed end of the first slot and locate the head portion of the fastener lying inwardly of the backing layer to either side of of the slot, and a second position compressed into the resilient layer by the head portion of the inserted fastener to allow movement of the head portion of the fastener through the second slot and into inwardly lying relationship to the backing layer to either side of the first slot, the flap being die cut from the backing layer and being frictionally retained in the first position by engagement with the backing layer as the flap resiliently returns to first position.

* * * * *